United States Patent [19]
Murphy, Jr. et al.

[11] Patent Number: 6,070,245
[45] Date of Patent: May 30, 2000

[54] APPLICATION INTERFACE METHOD AND SYSTEM FOR ENCRYPTION CONTROL

[75] Inventors: Thomas Edwin Murphy, Jr., Binghamton; Paul Francis Rieth, Apalachin; Jeffrey Scott Stevens, Endwell, all of N.Y.

[73] Assignee: International Business Machines Corporation, Armonk, N.Y.

[21] Appl. No.: 08/978,324

[22] Filed: Nov. 25, 1997

[51] Int. Cl.$^7$ ........................................ G09C 3/08
[52] U.S. Cl. ................. 713/201; 713/184; 713/190; 380/255; 380/239; 380/258
[58] Field of Search .................. 713/201, 184, 713/190, 202; 380/255, 239, 258, 37, 42, 287

[56] References Cited

U.S. PATENT DOCUMENTS

| | | | |
|---|---|---|---|
| 5,175,766 | 12/1992 | Hamilton | 380/49 |
| 5,224,166 | 6/1993 | Hartman, Jr. | 380/50 |
| 5,892,826 | 4/1999 | Brown et al. | 380/4 |

OTHER PUBLICATIONS

*AS/400 Advanced Series, Application Display Programming, Version 3*, IBM Publication SC41–4715–01 (1996).
*5250 Remote Control Unit Functions Reference*, IBM Publication SC30–3533, pp. 14–118 to 120.
*AS/400 DDS Reference Version 3*, IBM Publication SC41–3712, pp. 3–145 to 146.
A. Freier, et al. *The SSL Protocol Version 3.0*, Nov. 18, 1996 http://home.netscape.com/eng/ssl3/ssl–toc.html and http://developer.netscape.com/library/documentation/index.html.

*Primary Examiner*—Thomas R. Peeso
*Attorney, Agent, or Firm*—Shelley M Beckstrand

[57] ABSTRACT

A system and method is provided whereby a system or application programmer may control encryption on or off during a connection oriented session between a client and a server over the Internet/intranet. This is done by providing a keyword or command, such as a Data Description Specification (DDS) keyword or a User Defined Data Stream (UDDS), to insert into a data stream intended for the client an architecture command, the 5250 Write Single Structured Field (WSSF) architecture command carrying an unique structured field to indicate when encrypted mode should be made active or inactive.

11 Claims, 9 Drawing Sheets

ENCRYPT STRUCTURED FIELD COMMAND

APPLICATION INTERFACE METHOD AND SYSTEM FOR ENCRYPTION CONTROL

CROSS-REFERENCES TO RELATED APPLICATIONS

U.S. patent applications Ser. No. 08/977,547 entitled "System and Method for Server Virtual Printer Device Name Negotiation for Mobile Print Support"; Ser. No. 08/978,251, "System and Method for Server Virtual Device Name Negotiation", Ser. No. 08/978,252, "Method and System for IP Address Accessibility to Server Applications" contain subject all filed concurrently herewith on Nov. 25, 1997 and matter related, in certain respect, to the subject matter of the present application. The above-identified patent applications are incorporated herein by reference.

BACKGROUND OF THE INVENTION

TECHNICAL FIELD OF THE INVENTION

This invention pertains to selective encryption of data communicated on the Internet or the like. More specifically, it relates to enhancing the performance of communications by enabling applications to toggle encryption.

BACKGROUND ART

Communications and business transactions over an intranet or the Internet often require security safeguards to protect confidential information. This protection can be achieved through encryption of the communications through many common protocols, such as Secured Sockets Layer (SSL).

One disadvantage with using encryption is that it is much slower, due to the need to encrypt and decrypt data. By encrypting and decrypting all data at all times, CPU usage on computers is significantly impacted, and response time in applications is slowed by as much as a factor of five.

In an Internet/intranet environment, there is presently no control interface for an end user application to switch or toggle between encrypted and unencrypted transmission modes. That is, the level of the interface required to use encryption is below the application layer, which means that once the encryption mode is set, it usually cannot be changed while an application is running—unless the application has encryption built-in, it cannot take advantage of the ability to toggle modes.

Many legacy (older) applications cannot take advantage of security without a tradeoff in performance. Even so, encryption control is highly desirable for businesses that connect to both the Internet and a company intranet. For example, a business may want to have all Telnet clients that arrive from the Internet use encrypted transmission, while all Telnet clients from their intranet use unencrypted transmissions. Further, a business may only want encrypted transmission in effect when sign-on information is being exchanged, to avoid interception of user profiles and passwords, and speed up other data transfer.

It is an object of the invention to improve the performance of communications on the Internet and/or intranets.

It is a further object of the invention to improve such performance by selectively encrypting sensitive data while communicating less sensitive data in the clear.

It is a further object of the invention to enable applications to toggle between encrypted and clear communication modes.

It is a further object of the invention to enable legacy applications to take advantage of encryption mode setting and resetting with minimal program changes.

It is a further object of the invention to enable applications having the capability of encryption mode setting/resetting (or toggling) to interact with clients which are and which are not capable of supporting such encrypted communications.

It is a further object of the invention to enable user controlled and also program controlled setting/resetting or toggling of encryption mode.

SUMMARY OF THE INVENTION

System and method for toggling encryption in client/server communications.

In accordance with the method of the invention, toggling encryption mode during a connection oriented session between a server application and a client workstation is accomplished by establishing said session; communicating a data stream from said server application to said client workstation; putting an encryption mode keyword in said data stream from said application; responsive to said keyword: purging old data in the data stream to said client workstation; toggling encryption mode on the communication link between said server application and said client workstation; removing said keyword from said data stream; and thereafter, communicating new data in said data stream to said client workstation.

In accordance with the system if the invention for toggling encryption mode during a connection oriented session between a server application and a client workstation, there is provided a server application; a virtual terminal associated with said client workstation; an interactive subsystem for generating from said server application a data stream for putting to said virtual terminal; a virtual terminal manager for formatting said data stream for communication to said client workstation; and said virtual terminal manager being responsive to a command structure in a Write Single Structured Field (WSSF) data stream command to push old data in said data stream to said client workstation, to set the encryption mode, to remove said command structure from said data stream, and thereafter to communicate new data in the following or subsequent data stream to said client workstation in the mode prescribed by the command structure.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
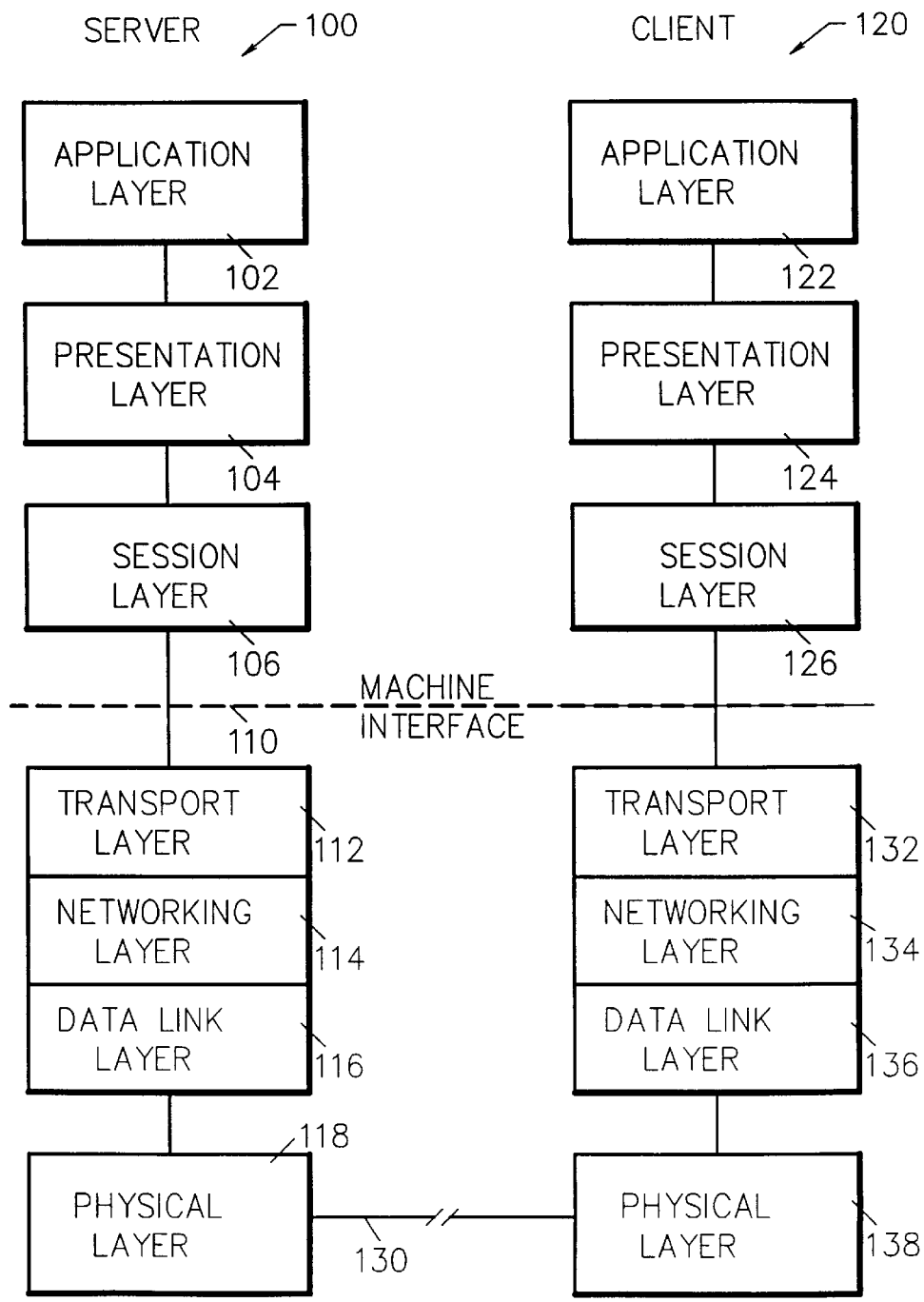
FIG. 1 is a high level system diagram illustrating the protocol levels of a typical system, such as the IBM AS/400 System.

In accordance with the present invention, a method and system is provided for resolving the workload/delay problems involved in using encryption by enabling an application to select when encryption is required, and not use encryption when it is not required. Encryption may not be required on every communication or transaction or even panel or panel portion communicated in connection with an application session. An application may desire, for example, to restrict encryption only to communications having credit card numbers, sign-on panels, passwords, and so forth. When encryption is not required, the application may use unencrypted transmission.

In accordance with the invention, a system and method is provided whereby a system or application programmer may selectively set encryption mode on and off. This is done by providing a keyword or command, such as a Data Description Specification (DDS) keyword or a User Defined Data Stream (UDDS), to insert a unique architecture command, such as the 5250 Write Single Structured Field (WSSF) architecture command, to indicate when encrypted mode should be made active or inactive. In this manner, a round trip performance advantage is obtained; that is, the response time model from a significantly slower client workstation may be improved by encrypting only a portion of the data transferred.

Further in accordance with a preferred embodiment of the invention, inasmuch as the IBM AS/400 system supports creation of 5250 data streams by any application program, the capability of inserting WSSF commands directly into the data stream is provided.

Further, in accordance with a preferred embodiment of the invention, the IBM AS/400 provides DDS support in the form of compilable source files, an example of such a source file being illustrated in Table 1. See, *DDS Reference*, IBM Publication SC41-3712-01, 2nd Edition June 1996. These compilable source files allow control of displays and panels for application programmers. Such controls include color, input fields, graphics, cursor control, and so forth. An example of a display panel, resulting from the DDS file of Table 1, is illustrated in Table 2.

An AS/400 application programmer creates a DDS source file including keywords, which are DDS controls. An example of a keyword developed for TCP/IP communications is the HTML keyword. A programmer level description of the HTML keyword and its use is described in *DDS Reference*, IBM Publication SC41-3712-01, 2nd Edition June 1996. A DDS keyword, of which HTML is an example, has the effect of inserting user data into the 5250 data stream for any application, and thus provides the capability for toggling encryption mode. To do this, a new DDS keyword "ENC" is defined, with flags for turning encryption on and off, and which hereafter may be referred to as ENCON and ENCOFF, respectively.

In accordance with a preferred embodiment of the invention, the WSSF structure provides the control mechanism including a unique class and type structured field representing secure and unsecure modes of communication. This control mechanism may be sent in the data stream directly using UDDS. Alternatively, and preferably, a new DDS keyword SECURE (or, alternatively for example, ENCON and/or ENCOFF) is provided for automatically inserting the WSSF and associated "encryption" structured field command into the data stream. This DDS keyword provides the identical data stream as the UDDS method, but in a more convenient and programmer-friendly manner (which may even not required a "programmer"). This keyword approach allows application programmers to control whether encrypted (secure) or clear (less secure) transmission occurs. For example, DOS is more of a presentation interface as opposed to the formal application logic, and can be more easily modified with such minor updates without the required involvment of an application programmer.

FIG. 1

Referring to FIG. 1, by way of overview and background, the protocol layers of, for example, an IBM AS/400 system include, at a server node 100, application layer 102, presentation layer 104, session layer 106, transport, networking and data link layers 112–114, respectively, and physical layer 118. The interfaces between these layers are tightly architected, and familiar to those skilled in the art.

Similarly, at client node 120, protocol layers 122, 124, 126, 132, 134, 136 and 138 correspond to the respective layers at server 100. Client system 120 and server system 100 communicate at the physical layer 118, 138 over communications link 130.

FIG. 2

Figure 2:
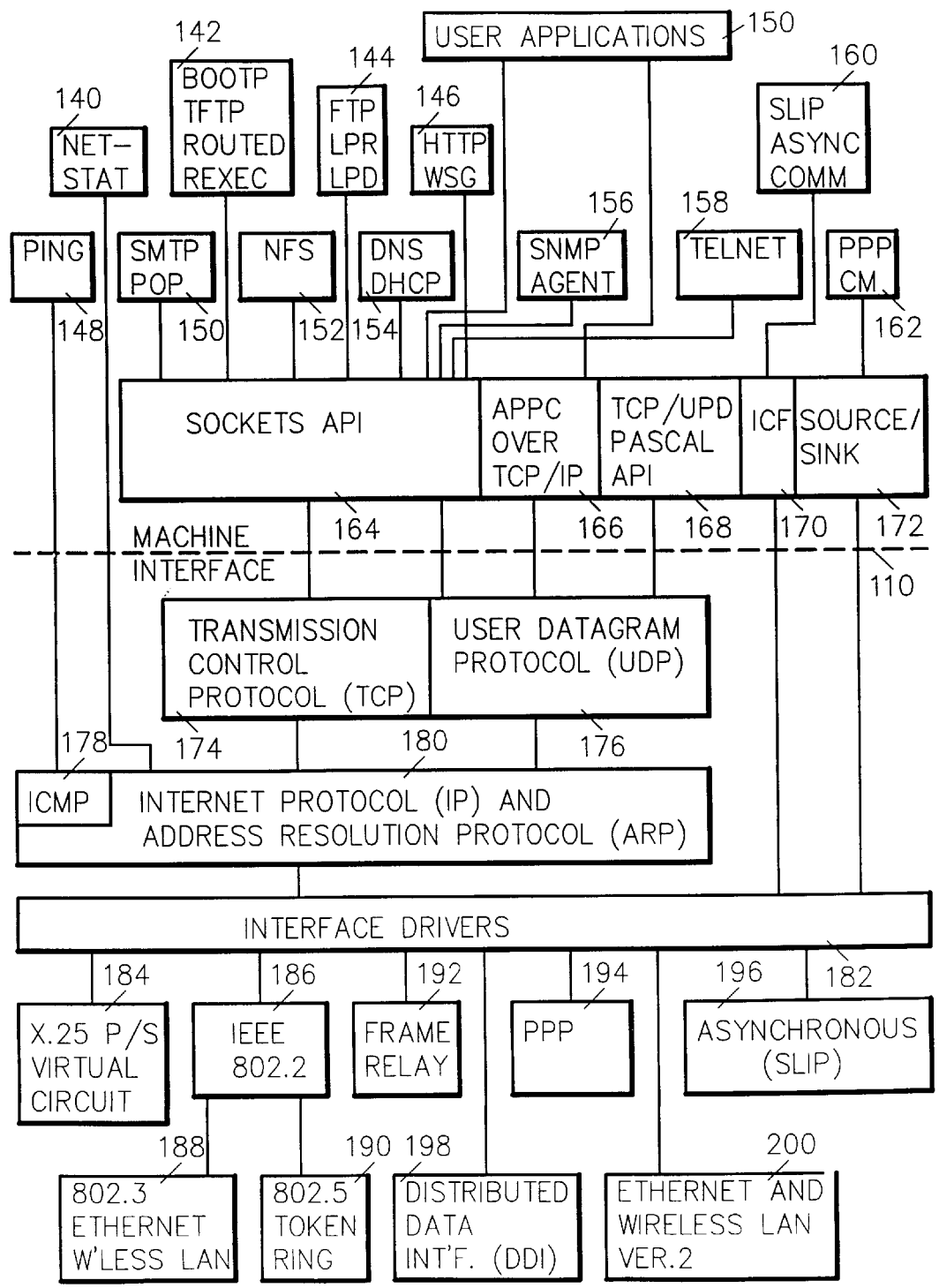
FIG. 2 is a system diagram illustrating the structure of TCP/IP on the IBM AS/400 System.

Referring to FIG. 2, further by way of background and overview, a block diagram in greater detail is shown of the TCP/IP structure on the IBM AS/400 System, which corresponds to the protocol layer structure of FIG. 1. In FIG. 2, and otherwise, the following acronyms are used:

API Application Program Interface
APPC Advanced Peer to Peer Communication
ARP Address Resolution Protocol
ASYNC Asynchronous
BOOTP Boot Protocol
COMM Communication
DDI Distributed Data Interface
DDS Data Description Specification
DHCP Dynamic Host Communication Protocol
DNS Domain Name Server
ENCON Encrypt on keyword
ENCOFF Encrypt off keyword
ESF Encrypt Structured Field command
FTP File Transfer Protocol
HTTP Hypertext Transfer Protocol (a web server)
IAC Interpret As Control
ICF Inter Communications Facility
ICMP Internet Communications Message Protocol
INT'F Interface
IP Internet Protocol
LAN Local Area Network
LPD Line Printer Daemon
LPR Line Printer Requestor
MI Machine Interface
NETSTAT Network status
NFS Network File System PING Packet Internet Groper
POP Post Office Protocol
PPP Point-to-Point Protocol
PPP/CM PPP Connection Manager
P/S Permanent/Switched
REXEC Remote execute
ROUTED Route Daemon
SLIP Serial Link Interface Protocol
SMTP Simple Mail Transfer Protocol
SNMP Simple Network Management Protocol
TCP Transmission Control Protocol
TCP/IP TCP/IP
TCP/UPD TCP/UPD
TELNET Remote terminal protocol
TFTP Trivial File Transfer Protocol
True Transparency Mode
UDDS User Defined Data Stream
UPD User Datagram Protocol
WSG Work Station Gateway (a web server)
WSSF Write Single Structured Field
WWW World Wide Web (uses TCP)
W'LESS Wireless
X.25 P/S An interface specification (OSI) P/S
802.3 Similar to Ethernet
802.5 Token ring Application layer 102 includes user applications code block 150.

Presentation layer 104 includes one or more of NETSTAT code block 140; BOOTP TFTP ROUTED REXEC code block 142; FTP LPR LPD code block 144; HTTP WSG code block 146; PING code block 148; SMTP POP code block 150; NFS code block 152; SNS DHCP code block 154; SNMP AGENT code block 156; TELNET code block 158; SLIP ASYNC COMM code block 160; and PPP connection manager 162.

Session layer 106 includes one or more of SOCKETS API code block 164; APPC OVER TCP/IP code block 166; TCP/UPD PASCAL API code block 168; ICF code block 170; and SOURCE/SINK code block 172.

The machine interface (MI) is at 110.

Transport layer 112 includes one or more of transmission control protocol (TCP) code block 174 and user datagram protocol (UDP) code block 176.

Networking layer 114 includes one or both of ICMP code block 178 and internet protocol (IP) and address resolution protocol (ARP) code block 180.

Data link layer 116 includes interface layers 182, including one or more of drivers X.25 permanent or switched virtual circuits 184; IEEE 802.2 driver 186 with 802.3 Ethernet wireless local area network (LAN) driver 188 and/or 802.5 token ring driver 190; frame relay driver 192; PPP driver 194; asynchronous SLIP driver 196; distributed data interface (DDI) driver 198; and Ethernet wireless LAN version 2 driver 200.

Advanced Program-to-Program Communication (APPC) 166, is used by transaction programs on, for example, the IBM System AS/400 to establish a conversation and send and receive data from a partner application within an Open System Interconnection (OSI) reference model, comprising seven layers: application 102, presentation 104, session 106, transport 112, network 114, data link 116 and physical 118. This OSI reference model, and the IBM AS/400 Communications Subsystem/400 implementation thereof, is described in IBM Application System/400 Technology Journal, Version 2, First Edition (January 1992), IBM Publication S325-6020-00, the teachings of which are incorporated herein by reference.

FIG. 3

Figure 3:
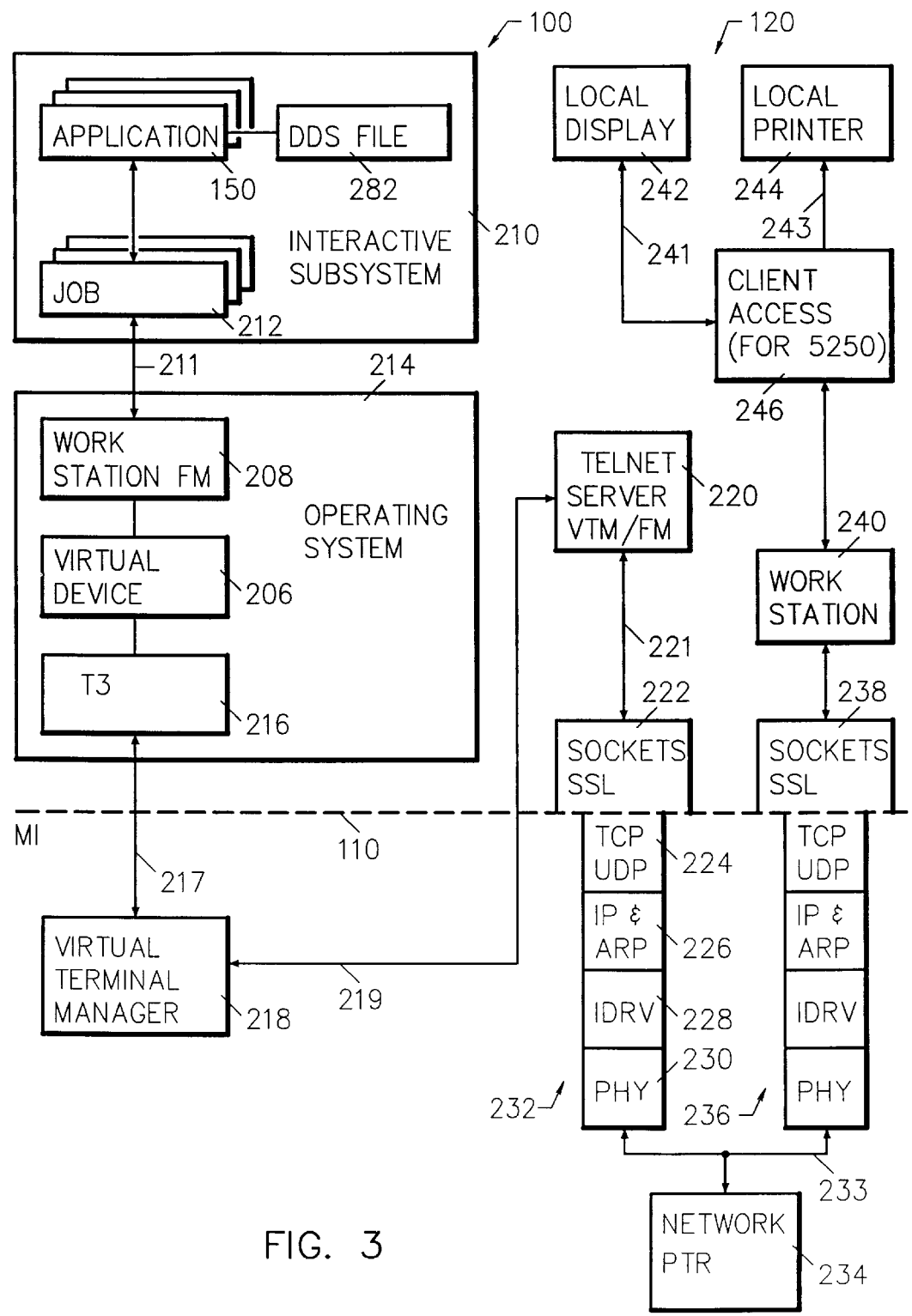
FIG. 3 is a high level system diagram illustrating the system apparatus of the invention.

Referring to FIG. 3, in accordance with a preferred embodiment of the invention, a system is illustrated for managing selective (that is, toggling or setting and resetting) encryption mode. Interactive subsystem (*SBSD) QINTER 210 communicates as respresented by line 211 to operating system 214. QINTER subsystem 210 is an interactive terminal system with many jobs 212, such as accounting jobs, database jobs, and so forth. There may exist several interactive subsystems 210, for example one for each of several locations, such as Endicott, Rochester, and so forth. A plurality of interactive subsystems 210 may share memory pools. Each of the plurality of jobs 212 contends for system resources, such as memory, CPU cycles. Jobs 212 run applications 150. Associated with selected applications 150 are display data stream (DDS) files 282 which contain screen displays, or templates. An application 150, in a sense critical to a preferred embodiment of the invention, is a combination of logic executing a program algorithm (contained in block 150) and associated screen display 282.

In Table 1, a sample DDS source file for a sign on panel is presented, and in Table 2 the panel display it creates.

Referring further to FIG. 3, Virtual devices 206 with which interactive *SBSD QUINTER 210 communicates reside in OS 214. Sample virtual device names are QPADEV0001, a sample virtual terminal device name, and RALEIGH1, a sample virtual printer device name.

Transmission to terminal (T3) code 216 interfaces OS output 214, and communicates as represented by lines 217 with virtual terminal manager (VTM) 218 below MI110. VTM 218 communicates with Telnet server 220, which is the VTM functional manager (FM), which communicates with sockets 222 as is represented by line 221. T3 216 is the last logical block between an application and the physical hardware terminal controller on an AS/400 system. T3 design predates the notion of virtual terminals (like Telnet) on the AS/400 system, and therefore operates as though it were actually communicating with a physical, twinax connected display or printer. VTM 218 is a block of code that intercepts the communications into and out of T3 216 and converts it for communicating to/from Telnet server 220 and thence TCP/IP stack 232.

Sockets 222, in this preferred embodiment, is a secured sockets layer (SSL), one of several protocols currently available for secure Internet, intranet, world wide web (WWW), or the like, connections (another being SHTTP). SSL 222 was originally developed by Netscape, and information regarding it is available at http://home.mcom.com/info/security-doc.html. The SSL Protocol 164, 222, 238 provides privacy and reliability between two communicating applications 210, 240, and includes two layers. At the lowest layer, layered on top of some reliable transport protocol, such as TCP 174, 224, is the SSL Record Protocol, which is used for encapsulation of various higher level protocols. One such encapsulated protocol, the SSL Handshake Protocol, allows server 100 and client 120 to authenticate each other and to negotiate an encryption algorithm and cryptographic keys before the application protocol (at the interface between 222 and 220, or 238 and 240) transmits or receives its first byte of data. See, A. O. Freier, et al, *SSL Protocol Version* 3.0, Transport Layer Security Working Group, Internet-Draft, Nov. 18, 1996, the teachings of which are incorporated herein by reference.

SSL 222 resides on top of TCP stack 232, which includes TCP or UDP 224 (174 or 176), IP & ARP 226 (180) and interface drivers 228 (182). The TCP stack interfaces physical layer (PHY) 230, which communicates with client 120 over TCP/IP network 233, to which is also attached network printer IB4312 IP:1.2.3.4 Name: NETWORK1 234. At client 120, communication lines 233 come in to TCP protocol stack 236, which interfaces SSL 238 above the MI 110 at workstation 240. Connected to workstation 240 are local display 242 and local printer IBM4019 IP:3.4.5.6 Name: RALEIGH1 244 over communication lines 241, 243, respectively. In this preferred embodiment, client access 246 is an IBM display emulator for the 5250 display. Other emulators may be used, such as UNIX based devices.

FIG. 4

Figure 4:
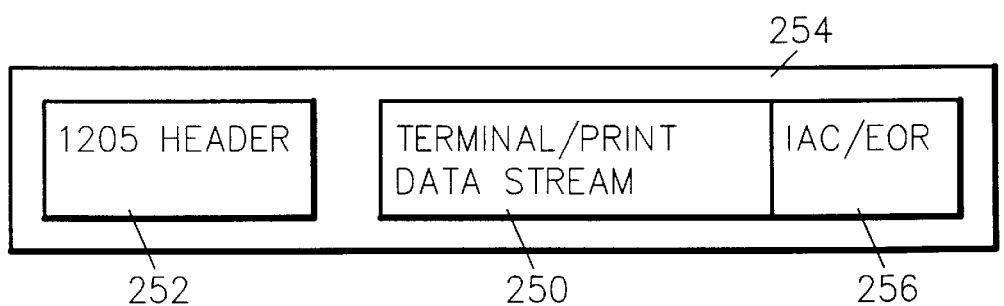
FIG. 4 is diagram illustrating the RFC 1205 format.

Referring to FIG. 4, an RFC 1205 message includes header 252, data stream 250, and end-of-record (EOR) field 256. EOR field 256, according to a subprotocol under Telnet, includes two bytes: x'FFEF', which are the interpret as control (IAC) byte FF and the EF command, which puts communications between server 100 and client 120 into supervisory mode during which the next character is interpreted as a command.

FIGS. 3, 4

Referring further to FIG. 3 in connection with FIG. 4, when VTM 218 gets a raw data stream on line 217 out of T3 216, it has to scan for what might be later improperly interpreted as the IAC character FF and to byte stuff by doubling the IAC. That is, when a FF is found by VTM 218 in the data stream on line 217, it doubles the FF by inserting a second FF character. This is done inasmuch as no commands are expected in the raw data stream 217. When the original data stream is later reconstituted, any double FF characters x'FFFF' will be excised back to a single x'FF' character and recognized as data.

FIG. 3, 5

Figure 5:
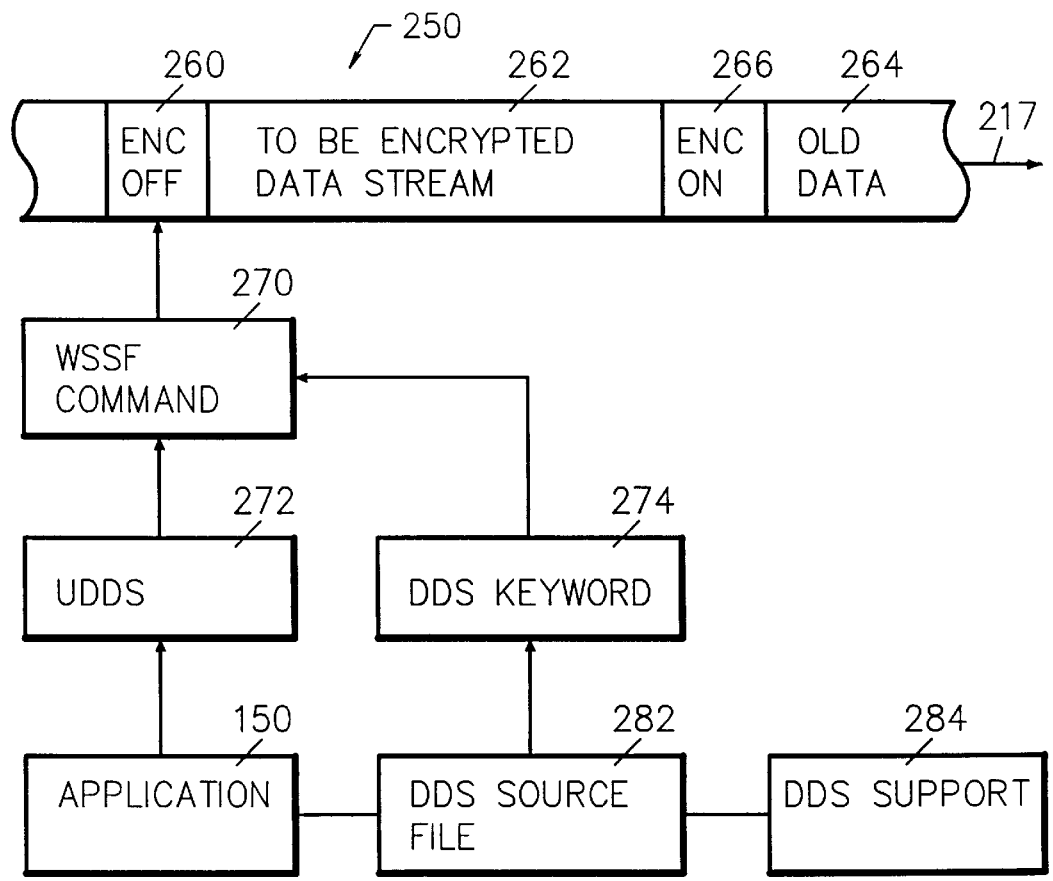
FIG. 5 is a block diagram illustrating a data stream format and alternative means for introducing WSSF commands.

Referring to FIG. 5 in connection with FIG. 3, DDS source files 282 are created and maintained for application 150 by DDS support 284, and application 150 can set variables in DDS 282.

Further in operation, referring to FIG. 3 in connection with FIG. 5, in accordance with a preferred embodiment of the invention, one can edit the DDS source FILE 282 to include an encrypt on (ENCON) DDS keyword 274 at an appropriate position in a DDS screen file 282, and rely on OS 214 in response to a PUT command from unmodified application 150 including this screen file 282 to compile the DDS to generate the appropriate WSSF command 270. This is accomplished as follows. Data streams on line 211 from application 150 together with DDS 282 data streams are presented by OS 214 as a 5250 data stream that incorporates the intention of application 150 (to encrypt from this point in time) as a write single structure field WSSF with a true transparent mode (TTM) ordering encryption on, for example. (The effect of the TTM bit being turned on is to hide the command on the display screen. However, inasmuch as the encryption on/off DDS keywords ENCON or ENCOFF are, in this preferred embodiment, stripped from the data stream before being communicated to the client, the use of TTM is not essential.) This data stream gets to telnet server via T3 216 and VTM 218. VTM 218 gets the data stream as a raw 5250 data stream on line 217 which has sprinkling of screen attributes (DDS) materials. Hence the unmodified application 150 may reference a recompiled DDS file 282 which had been modified to include the ENCON or ENCOFF keyword resulting in the 5250 datastream WSSF with the encrypt structure command thereby indicating change of encryption mode to VTM 218. DDS file template 282 avoids the necessity of coding a UDDS 272 directly into the data stream by using a screen display 300, 306, or 320 which allows the user to enter such keywords (ie, ENCON, meaning telnet encryption on) such as in a hidden field 322, for example, followed latter in this or some subsequent screen with telnet encryption off keyword ENCOFF. This avoids the necessity and complications associated with making application changes by the UDDS approach, but does not preclude doing so with applications which more directly communicated with their devices without dependence on DDS.

FIG. 5

Referring to FIG. 5, data stream 250 includes a sprinkling of DDS materials introduced by WSSF commands 270, including display screen attributes (SA) and, in accordance with the present invention, a start encryption attribute 266 and a stop encryption attribute 260. WSSF commands 270 are generated in response to DDS keyword 274 from DDS source file 282, or UDDS 272. UDDS 272 and DDS keywords 274 are generated by application 280, the latter by reference to DDS source file 282 which is maintained by DDS support 284.

Application 210 can change variable values in overlay template 212. Templates 212 are easily changed or edited and compiled. In accordance with the invention, one could simply introduce start encryption and stop encryption codes 264, 260, respectively. As is illustrated at 260, 264, Telnet removes the extra WSSF command from the data flow. That is, WSSF encrypt structured field (ESF) command is introduced into the 5250 data stream 250 that includes a WSSF command with the encrypt structure, and when introduced, VTM 218 takes whatever data 250 there is and sends it out through SSL 222 with special handshaking.

In accordance with the invention, controller 218 communicates through tcp stack 224-230 across communication link 233 to other stacks, such as 236. In this respect, VTM 218 appears as a logical terminal 244.

Workstation functional manager (WS/FM) included within terminal subsystem 210 communicates with the VTM 218 using 5250 format, which VTM 218 when seeing the WSSF encrypt structured field (ESF) stops time and takes necessary action to start encryption. In accordance with a preferred embodiment of the invention, telnet server 220 sets the appropriate flags to turn on the encryption using secure sockets layer SSL 222 controls. Other approaches for secure world wide web (WWW) connections encompassed within the method and system of the invention exist, such as the secure hypertext transfer protocol (SHTTP). Telnet server VTM/FM 220, upon detecting a WSSF 332, 334 with encrypt structured field (ESF) 348 in data stream 250 responds by setting the appropriate communications mode (encrypted or not incrypted) with the client 236.

Client 120 needs to initiate its session for this particular connection to server 220 initialy in secure mode to subsequently allow for dynamic switching of encryption mode.

FIGS. 6, 7

Figure 6:
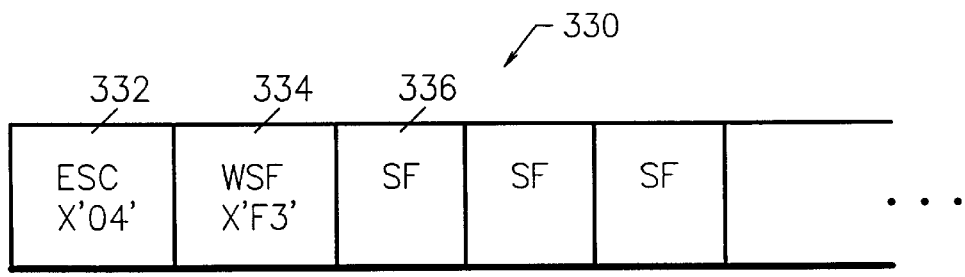
FIG. 6 is a diagram illustrating the format of a WSF/SF command string.
Figure 7:
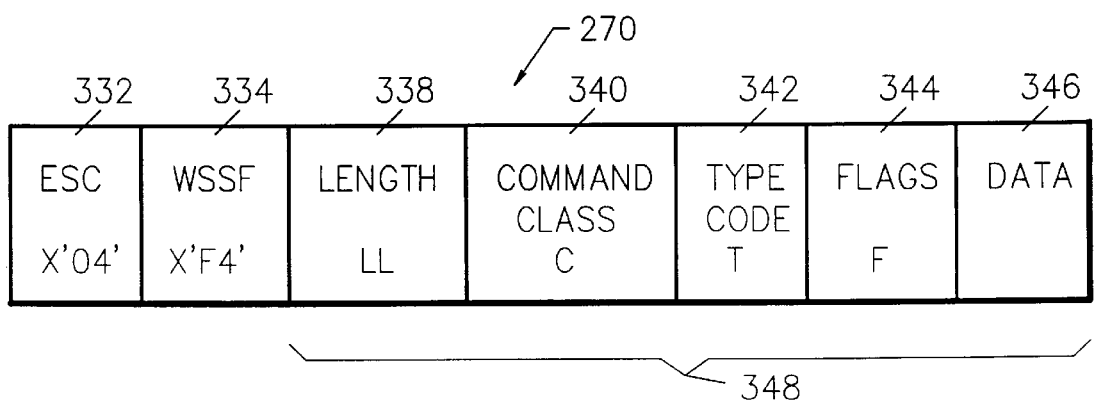
FIG. 7 is a diagram illustrating the format of a WSSF command, including a true transparency write command.

FIGS. 6 and 7 illustrate the formats of WSF/SF strings and WSSF records 330 and 270, respectively. See, 5495 Remote Control Unit Functions Reference, Release 3.0, IBM Publication SC30-3533-03, 4th Ed. November 1994, pages 14-1 through 14-5, 14-118 through 14-120, and 14-127 through 14-136.

The write structured field (WSF) command 334 introduces data structures 330 into the data flows, or strings, in support of pass-through display, functional information transfer, and control of workstations during text support operations. Data structure 330 includes escape ESC 332, the command code WSF 334, and a string of structure fields SF 336. The data returned to OS 214 in response to a WSF command 334 includes Row, Column, AID Code, and Structured Field. The contents of the Row, Column, and AID Code fields are determined by the type of information in structure field 336. When structured fields are used for text support, the Row and Column fields define cursor location in display 242, and the AID Code field indicates which AID key the workstation 240 operator pressed. When cursor location is not relevant to the contents of the structure field, these fields are set to 0 (x'0000'), and the AID Code is used as follows: x'FF' identifies a pass-through data stream reply, and x'88' identifies a QUERY reply. A structured field 336 is a construct assembled from several control fields and a data field of varying length, the following construct being that which is of interest to the present invention: LLCTFD, where LL is length, C is class code, T is type code, F is format control flags, and D is data. With the C=x'D9' and T=x'70', a QUERY command is contained in the structured field.

FIG. 7

Referring to FIG. 7, the format structure of the WSSF command, also referred to as the payload in connection with the present invention, includes escape character ESC 332, WSSF in command field 334, followed by the encrypt structured field 348 which is comprised of length LL field 338, command class C field 340, type code T field 342, flags F 344 and optionally data 346. This format is typical of similar commands, such as write to display, read, WSF. This payload is placed on line 217 as input to VTM 218. Normally, interactive subsystem application 150 provides PUTs to virtual device 206 for display at 242 which includes standard 5250 data stream commands and structures. WSF 330 include data in groups of chained structure fields 336, and WSSF while not chained includes data 346 in a special type of structured field, the encrypt structured field write command 348. In accordance with the invention, a particular WSSF with a type code T 342 set to indicate an encryption command is provided. This type code T 342 is what VTM 218 uses to control encryption setting. WSSF 270 has the advantage that it cannot be chained, making it much easier for VTM 218 to interpret it.

FIGS. 5, 7

Referring to FIG. 5 in connection with FIG. 7, when one edits and then compiles DDS 282 to turn on encryption, the compiler injects a WSSF command data stream 270 of x'04F40005D96B00' into position 260 on line 217, where 04 is the escape character 332, F4 is the WSFF command 334, and the appended encrypt structured field command 348 includes 0005 is the length LL 338

D9 is command class C 340

6B is the type code T 342 for the encryption control command (x'6B' is an illustration of a code selected for this purpose.)

00 is the flag (where flag=00 indicates encryption off, and flag=01 indicates encryption on). When it is desired to turn on encryption for a selected number of bytes, rather than until expressly toggled off, the LL field 338 may be set to 0007, and a two character data field 346 appended which includes the number of bytes in the subsequent data stream to be encrypted.

Alternatively, the programmer of an application 150 could include a user defined data screen (UDDS) which sends a data stream directly from application 150 (without an accompanying DDS file 282) in a PUT to OS 214 including the WSSF command 270. This latter approach is useful, for example, in a session's "First Program to Call", to encrypt the entire session until turned off (that is, until encryption is switched off by a subsequent WSSF command 270.)

The WSSF command 270 inserted in the data stream on line 217 at 266 is followed by the data to be encrypted 262 for the number of bytes set in field 346 or until a WSSF command 260 of x'04F40005D96B00, interpreted as above, as compiled by OS 214 into data stream 217; or alternatively the WSSF command 270 is placed into data stream 214 directly from UDDS block 272.

In further description of the operation, in accordance with the invention, interactive subsystem 210 creates a data stream (with FFs not yet doubled) on line 211 which is fed to work station functional manager 208 in OS 214. The WS/FM 208 passes the data stream to the VTM 218 where the data stream 250 is sent from T3 216 as a 5250 data stream, which is a hex data stream, using a request I/O (ReqIO) send/receive message (SRM) on line 217 to virtual terminal manager (VTM) 218 below MI 110. VTM 218 prepends data stream 250 with an RFC 1205 header, and communicates the resulting message 254 over lines 219 to VTM functional manager (VTM/FM) 220, which feeds it on to sockets layer 222 over a high level interface line 221.

From SSL 222 and TCP stack 232, message 254 is communicated to client workstation 240 over communications link 233, and through TCP stack 236 to SSL 238. SSL extracts data stream 250 from message 254 and feeds it via workstation 240 and, possibly, client access 246 to local display 242 over line 241 or to local printer 244 over line 243, as the case may be. The process is reversed in communicating from client 120 to server 100.

FIG. 8

Figure 8:
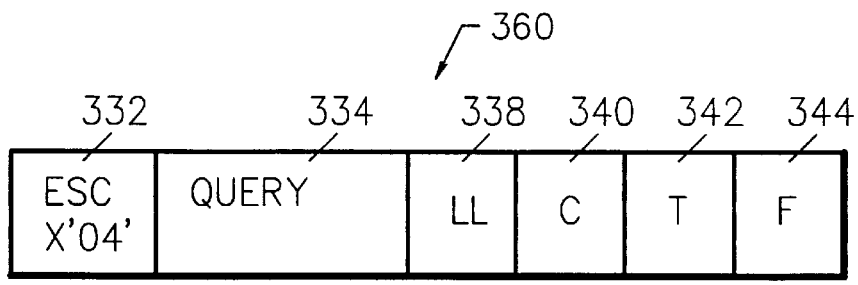
FIG. 8 is a diagram illustrating the format of a Query command.

Thus, referring to FIG. 8, a QUERY command structure includes ESC 332, QUERY 334, LL 338, C 340, T 342 and F 344, with C=x'D9', indicating structured field command class, and T=x'70', the type code for the query function.

FIG. 9

Figure 9:
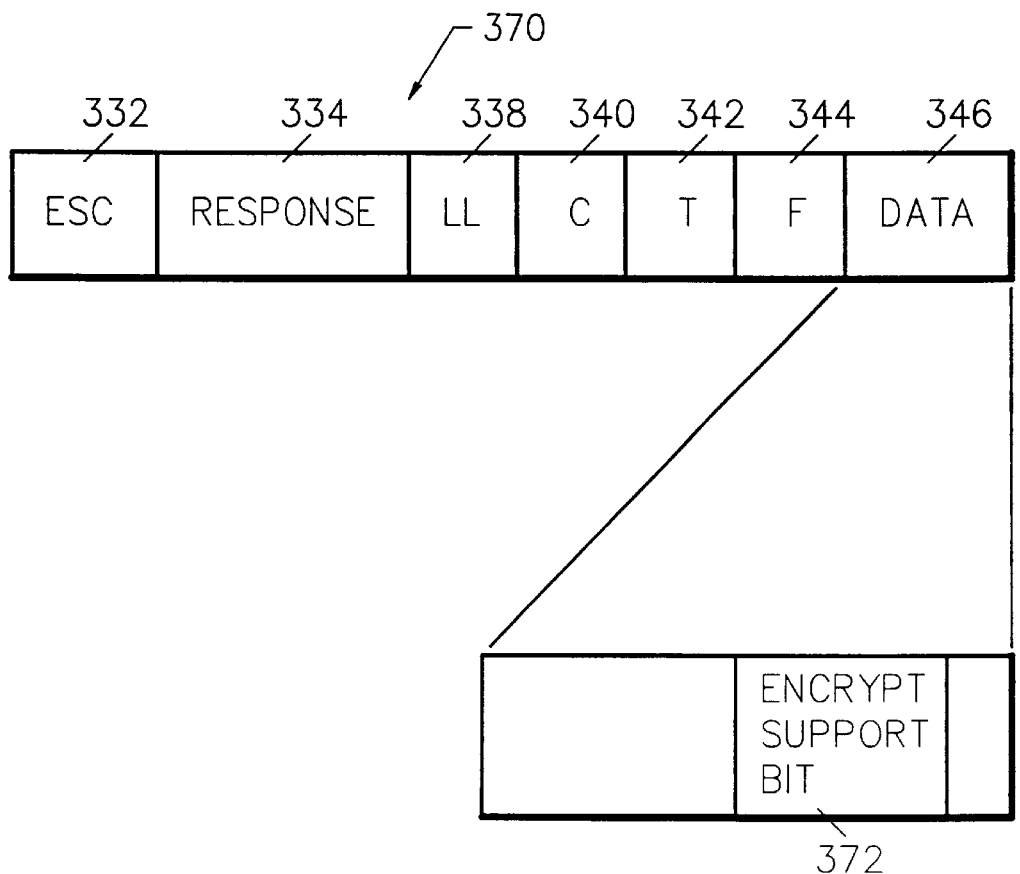
FIG. 9 is a diagram illustrating the format of a Response command.

Referring to FIG. 9, a query RESPONSE command structure includes ESQ 332, RESPONSE 334, LL 338, C 340, T 342, F 344, and DATA 346, with c=x'D9', indicating structure field command class, and T=x'70', the type code for the query function, and F=x'80', a fixed code for a query response. The data field 346 includes several bytes of information indicting controller type, workstation type, machine type, machine model number, device codes, input fields available, customization parameters, operating capabilities, display screen capabilities, text symbols support, language support, color attributes, ideographic capabilities, bidirectional printing, graphics capability, word wrap, programmable mouse buttons, and the like. Of interest to the current invention is a data field 346 bit 372 set to indicate support capability for the encrypt structured field.

Thus, in accordance with a preferred embodiment of the invention, communications to a device is initiated by OS 214 sending a WSSF as the first command to VTM 218. VTM 218 responds by advising OS 214 if it can handle WSSF type 6B commands (SSL with encryption) by setting the appropriate QUERY reply data bit.

FIG. 10

Figure 10:
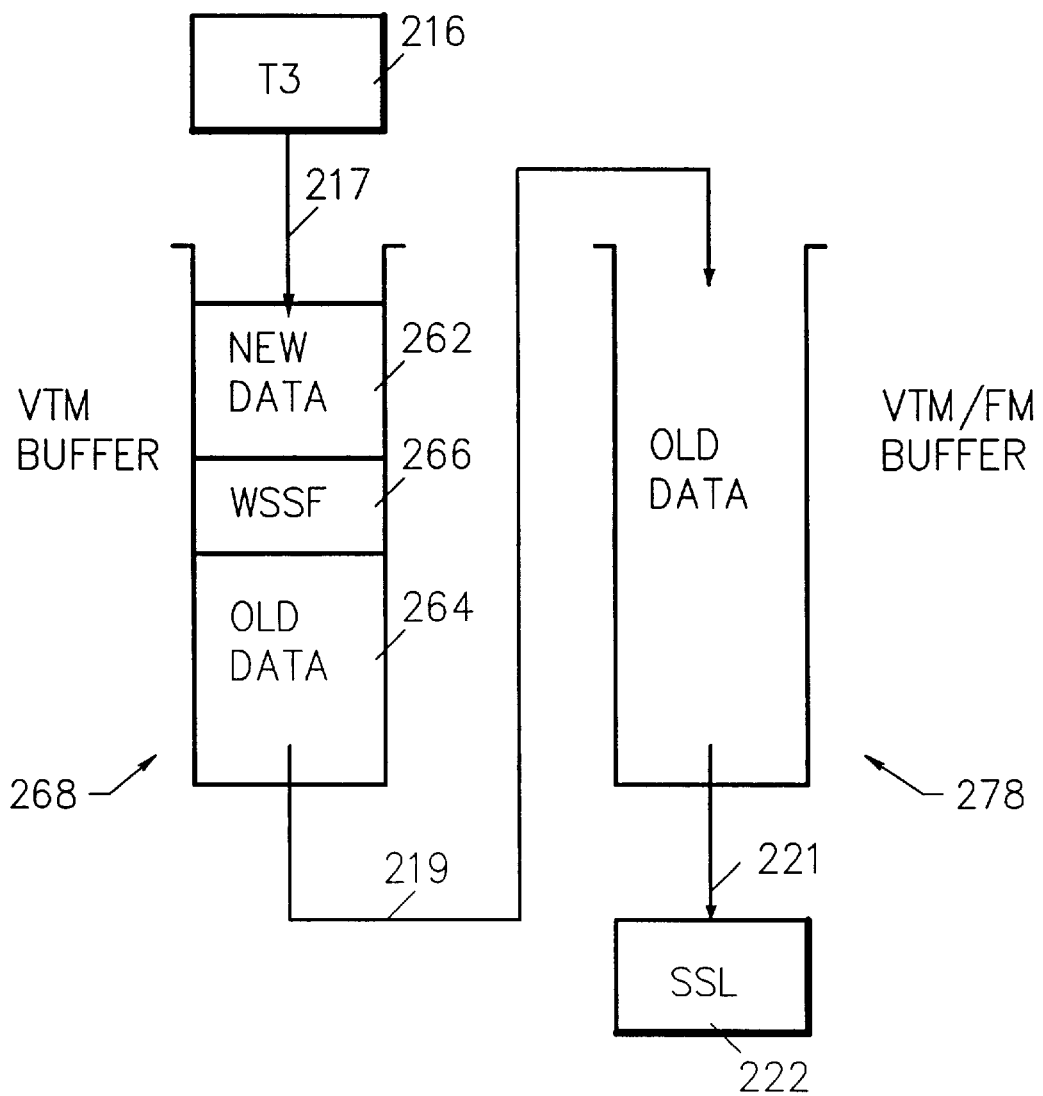
FIG. 10 is a diagram illustrating the flow of data through the VTM and VTM/FM buffers when a WSSF command is detected in the data stream.

Referring to FIG. 10, the operation of VTM 218 is illustrated. VTM 218 includes VTM buffer 268, and VTM/FM 220 includes VTM/FM buffer 278. Upon detecting a WSSF command 266 to switch encryption on in the data stream 217 from T3 216, VTM 218 halts time and flushes through old data 264, received previous to the WSSF command 266, to VTM/FM buffer 278. VTM 218 also sends a command to VTM/FM to flush its buffer 278 of old data, and to respond with an indication that all old data has been transferred to SSL 222, received by client 120; further, that client 120 has the capability of accepting and decrypting encrypted data, and that SSL 222 and SSL 238 have executed a socket program which establishes a secure link over 233. If this response is received successfully, a RESPONSE message is returned to OS 214 by VTM 218. Thereupon, the WSSF command 266 is deleted from the data stream, and new data obtained from T3 216 which will be encapsulated and transferred to client 120 as encrypted data through TCP stacks 232, 236 and communication link 233. OS 214 transfers data to be encrypted 262 to VTM buffer 268 for encapsulation, doubling of the FFs, and communication through secure socket layer (SSL) 222 to client 120, where it will be decrypted by SSL 238 and fed to work station 240 in clear text.

Similarly, upon detecting a WSSF command 266 to switch encryption off, VTM 218 flushes old data (which in this instance is data being encrypted) from VTM buffer 268, waits for a response back from VTM/FM 220 that all data in its buffer 278 to be transmitted encrypted has been transmitted, and that the socket programs turning off encryption have been executed by SSLs 222 and 238. Thereupon, the WSSF command 266 is deleted from the data stream, and new data obtained from T3 216 which will be encapsulated and transferred to client 120 as clear data through TCP stacks 232, 236 and communication link 233.

Table 3 sets forth a high level psuedo-code representation of an algorithm for controlling encryption using the SSL protocol.

FIGS. 11A, 11B

Figure 11A:
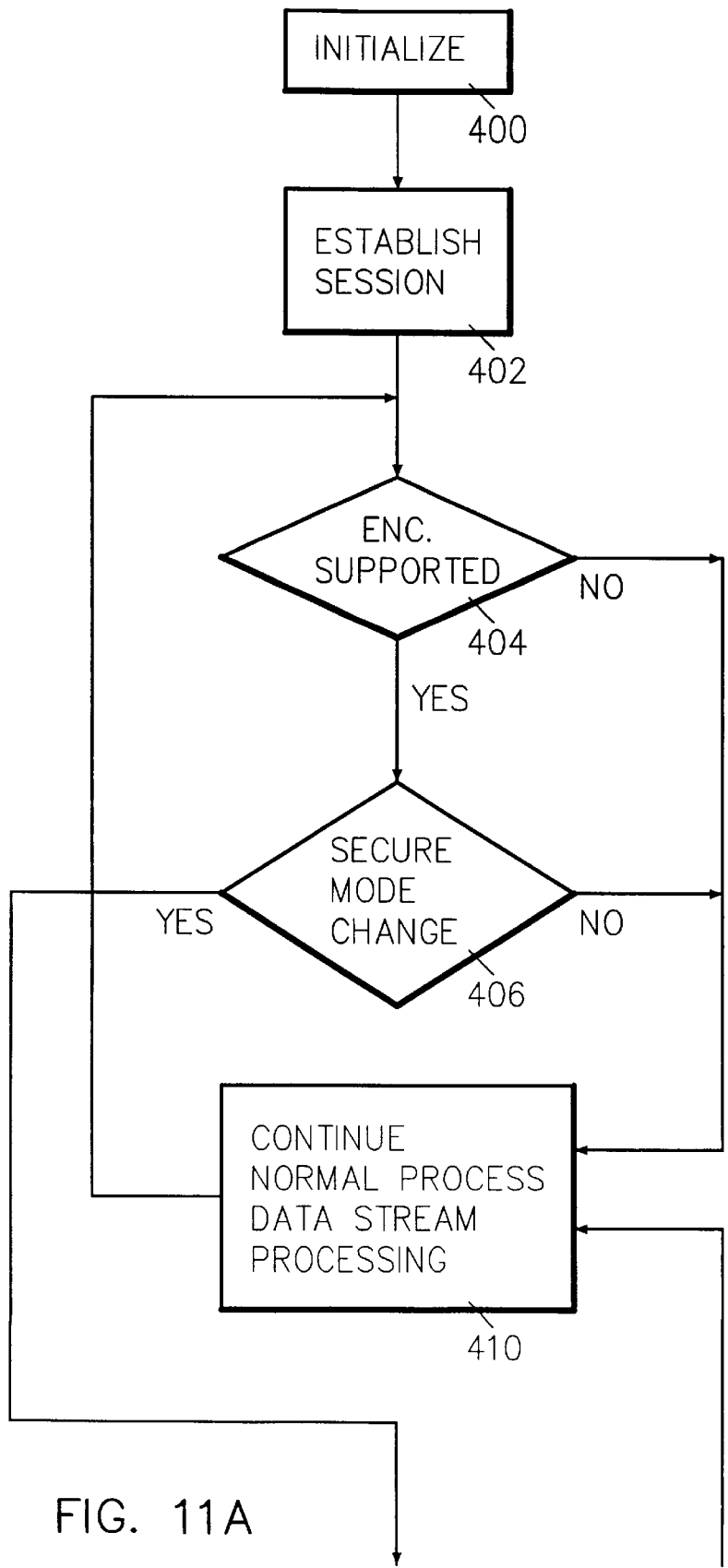
FIGS. 11A and 11B, oriented as illustrated in FIG. 11, are a flow diagram illustrating selected method steps from a preferred embodiment of the invention for changing encryption mode.
Figures 11, 11A, 11B:
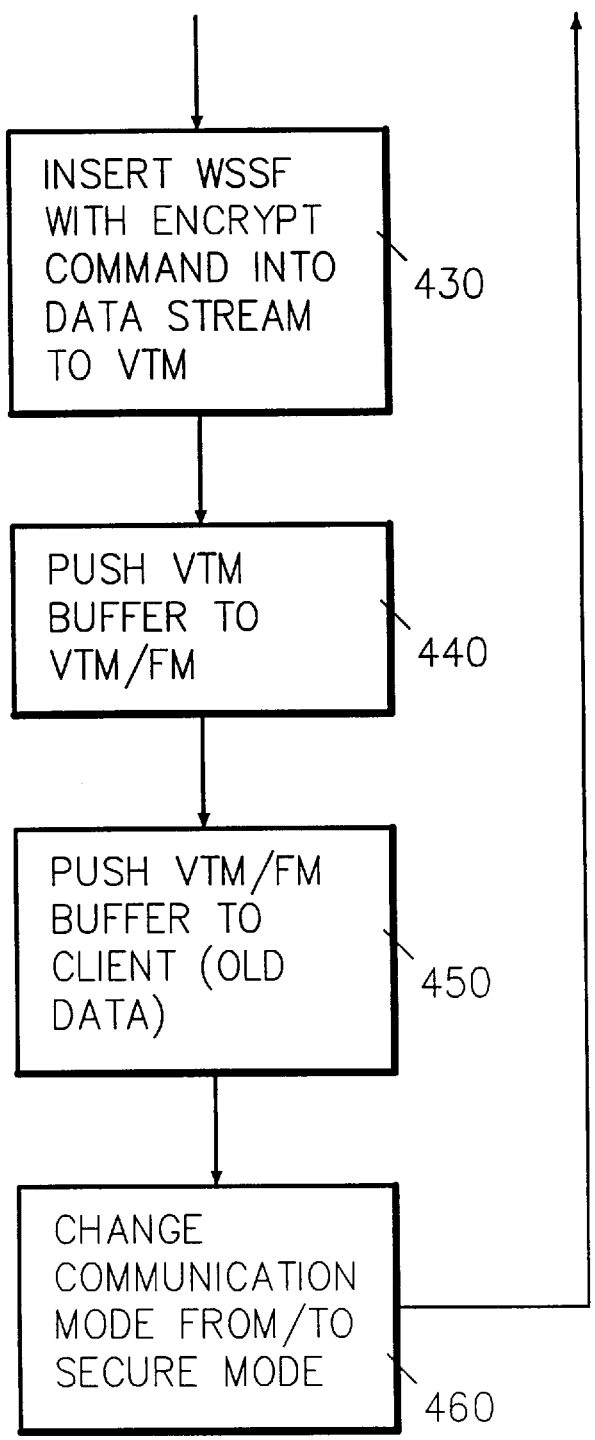

Referring to FIGS. 11A and 11B, the method steps of an embodiment of the invention for setting encryption will be described. In steps 400 and 402 the system is initialized and a session established between server 100 and client 120.

In step 404, operating system 214 determines if ENCON/ENCOFF DDS keywords are supported by the system attached to T3 216. If not, switching of encryption is not supported, and in step 410 normal operation continues, including WSF chains and, possibly, WSSF commands (for other than encryption type.) In normal operation in accordance with one specific embodiment, before doubling any FF characters, VTM encapsulates the original data stream 217 into a 5250 data stream, 3270 data stream, VT100 data stream, or the like, doubles any FF characters as previously described, and puts the resulting data stream on line 219. The reverse process occurs when VTM 218 takes data from VTM/FM 220 on line 219 to process through to line 217 for operating system 214.

Normal processing occurs, also, until interactive subsystem 210 determines, as represented by step 406, that the encryption mode is to be set on or off; whereupon in step 420, in accordance with the operation of this embodiment of the invention, application 150 writes to the virtual device 206 at workstation functional manager (FM) 208 a WSSF including encrypt structure command. In step 430, OS 214 passes a 5250 data stream with WSSF which T3 216 sends on line 217 to VTM 218. In step 440, VTM 218 ensures that everything previously received is transmitted (pushed/flushed) from its buffer 268 to server 220, and in step 450 forwarded (pushed/flushed) on to and received by client 120. Thereupon, in step 460, VTM 218 initiates a control internal dialog between VTM 218 and VTM/FM 220 using the SSL protocol by initiating an SSL connection in secure mode, which requires an SSL 222/SSL 238 dialog, with encrypt on or off as required by the WSSF. Once that secure dialog is established, VTM 218 sends a feedback confirmation to OS 216, which thereupon continues in step 410 with normal screen I/O operation, and VTM 218 removes the payload (including WSSF) from the data stream to client 120.

Many legacy applications 150 at server 100 exist which are unable to take advantage of encryption without significant modification. This invention allows them to do so for displays 242, and to do so by sending out a single data stream 250 which can selectively turn on encryption, for example, in the sign on panel on displays 304, and will remain on throughout the session (as long as the SSLs 222, 238 include the command 266 turning on the encryption.)

In accordance with a further embodiment of the invention, server 100 first program to call could send out a command 266 with encryption on and thus turn on encryption for all users. Interactive subsystem 210 supports the commands 266, 260 which turn encryption on and off, respectively. Server 220 talks to client 120, both having SSL stacks 222–230, 236–238, respectively.

In accordance with a further embodiment of the invention, program controlled setting of encryption mode, without dynamic mode switching (encryption on and off), a subsystem description (SBSD) is used to select a device name to move data through secure links with tuning, memory allocation, QDDSS signon panel, language etc. This can also include commands for encryption by putting keywords in a DDS signon panel 300, 306 and handled as a configuration option instead of being done by each individual application 150.

Legacy applications 150 don't have to change. In accordance with the invention, DDS files, or template overlays 282 can be modified, with keywords saying ENCRYPT ON and eventually ENCRYPT OFF. One may make a change to a legacy DDS template 212 to include or allow entry of the encryption keyword to establish encryption setting in accordance with the invention.

The overlay DDS keyword specifies that the record format being defined should appear on the display without the entire display being deleted first. See, AS/400 DDS Reference Version 3, IBM publication SC41-3712-01, Second edition, June 1996, pages 3-181 through 3-182.

ADVANTAGES OVER THE PRIOR ART

It is an advantage of the system and method of the invention the performance of communications on the Internet and/or intranets is improved by selectively encrypting sensitive data while communicating less sensitive data in the clear.

It is a further advantage of the invention that applications are enabled to switch between encrypted and clear communication modes.

It is a further advantage of the invention that legacy applications are enabled to take advantage of encryption mode toggling with minimal changes, primarily if not exclusively to the DDS files.

It is a further advantage of the invention that applications having the capability of encryption mode switching are enabled to interact with clients which are and which are not capable of supporting such encrypted communications.

It is a further advantage of the invention that selection of encryption mode may be controlled by minor updates to legacy applications which do not required the involvement of application programmers.

It is a further advantage of the invention that selection of encryption mode may be added to legacy application display files by editing and compiling the display files without requiring the expertise of a skilled application programmer, thereby affording quick and simple updates to legacy applications.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

TABLE 1

DDS SIGNON PANEL SOURCE

```
 *
 A    R   SIGNON
 A                                      CLEAR
 A                                      BLINK
 A                           01 23'              Sign On
 A                              DSPATR(HI)
 A                           02 48'System. . . . . . . :'
 A        SYSNAME    8    0  02 70
 A                           03 48'Subsystem . . . . :'
 A        SBSNAME    10   0  03 70
 A                           04 48'Display . . . . . . :'
 A        DEVNAME    10   0  04 70
 A                           06 17'User . . . . . . . . . . . . .'
 A        USERID     10   B  06 53
 A 01                        07 17'Password . . . . . . . . . .'
 A 01     PASSWRD    10   I  07 53
 A                              DSPATR(ND)
 A                           08 17'Program/procedure . . .'
 A        PROGRAM    10   B  08 53CHECK(LC)
 A                           09'Menu . . . . . . . . . . . . .'
 A        MENU       10   B  09 53CHECK(LC)
 A                           10 17'Current library. . . . . . .'
 A        CURLIB     10   B  10 53CHECK(LC)
 A 02     QSNERROR   80   0  24 01DSPATR(HI)
 A        COPYRIGHT  40   0  24 40DSPATR(HI)
 A        UBUFFER    128  H
 *
```

TABLE 2

DDS SIGN ON PANEL DISPLAY EXAMPLE

```
            Sign On
                System. . . . . . . . :   XXXXXXXX
                Subsystem . . . . . :     XXXXXXXXX
                Display . . . . . . . :   XXXXXXXXX
    User . . . . . . . . . . . . . . . . _____
    Password . . . . . . . . . . . . _____
    Program/procedure. . . . .    _____
    Menu . . . . . . . . . . . . . . . _____
    Current library. . . . . . . .    _____

© COPYRIGHT IBM CORP. 19XX, 19YY.
```

TABLE 3

SSL ENCRYPTION CONTROL

Initialize SSLInit Structure
Make SSL_Init function call
Socket/bind/listen on SSL_Port
SSL Create and Handshake for Incoming Request
  Create Flag Parameters:
    SSL_ENCRYPT
    SSL_DON'T_ENCRYPT
  Handshake How Parameters:
    SSL_HANDSHAKE_AS_CLIENT
    SSL_HANDSHAKE_AS_SERVER TABLE 3-continued

SSL ENCRYPTION CONTROL

Read from the SSL_Port
Write to the SSL_Port

We claim:

1. Method for controlling encryption mode selectively in a first mode and a second mode during a connection oriented session between a server application and a client workstation, comprising the steps of:

establishing said session in said first mode;

while communicating a data stream from said server application to said client workstation in said first mode detecting an encrypt structured field in said data stream;

responsive to said encrypt structured field:

flushing old data in the data stream prior to said encrypt structure field to said client workstation in said first mode;

switching mode on the communication link between said server application and said client workstation to said second mode;

removing said encrypt structured field from said data stream; and thereafter, communicating new data in said data stream subsequent to said encrypt structured field to said client workstation in said second mode.

2. The method of claim 1, said first mode selectively being encryption on mode or encryption off mode, and said second mode being the other of said encryption on mode or said encryption off mode.

3. The method of claim 1, said encrypt structured field including a parameter specifying length, further comprising the step of switching mode on said communication link after transmitting new data of said specified length.

4. System for controlling encryption mode during a connection oriented session between a server application and a client workstation, comprising:

a server application;

a display data stream file;

a virtual terminal associated with said client workstation;

an interactive subsystem for generating from said server application and said display data stream file a data stream for putting to said virtual terminal;

a virtual terminal manager for formatting said data stream for communication to said client workstation; and said virtual terminal manager being responsive to an encrypt structured field in said data stream to transmit old data in said data stream to said client workstation, to initiate changing of the encryption mode, to remove said encrypt structured field from said data stream, and thereafter to communicate new data in said data stream to said client workstation.

5. System for switching encryption mode during a connection oriented session between a server application and a client workstation, comprising:

a server application;

a virtual terminal associated with said client workstation;

an interactive subsystem for generating from said server application a data stream for putting to said virtual terminal;

a virtual terminal manager for formatting said data stream for communication to said client workstation; and said virtual terminal manager being responsive to a user defined mode controlling command in said data stream to transmit old data in said data stream to said client workstation, to initiate switching of the encryption mode, to remove said switching command from said data stream, and thereafter to communicate new data in said data stream to said client workstation in the switched encryption mode.

6. A program storage device readable by a machine, tangibly embodying a program of instructions executable by a machine to perform method steps for setting encryption mode during a connection oriented session between a server application and a client workstation, said method steps comprising:

establishing said session in a first mode;

while communicating a data stream from said server application to said client workstation in said first mode detecting an encrypt mode command in said data stream from said application;

responsive to said encrypt mode command:
flushing old data in the data stream prior to said encrypt mode command to said client workstation;
switching encryption mode on the communication link between said server application and said client workstation to a second mode;
removing said encrypt mode command from said data stream; and thereafter,
communicating new data in said data stream subsequent to said encrypt mode command to said client workstation in said second mode.

7. An article of manufacture comprising:

a computer usable medium having computer readable program code means embodied therein for toggling encryption mode between a first mode and a second mode during a connection oriented session between a server application and a client workstation, the computer readable program means in said article of stream; and computer readable program code means for causing a computer to communicate new data in said data stream to said client workstation in said second mode.

8. Method for controlling encryption mode during a connection oriented session between a server application having an associated screen display data stream (DDS) file and a client workstation, comprising the steps of:

establishing said session in a first encryption mode;
communicating a data stream from said server application to said client workstation;
putting an encrypt mode command in said data stream from said application or screen DDS file, said encrypt mode command separating old data and new data in said data stream;
responsive to said encrypt mode command:
flushing said old data in the data manufacture comprising:
computer readable program code means for causing a computer to establish said session in said first mode;
computer readable program code means for causing a computer to communicate a data stream from said server application to said client workstation in said first mode;
computer readable program code means for causing a computer to put an encrypt mode command in said data stream from said application;
computer readable program code means for causing a computer responsive to said encrypt mode command to:
flush old data in the data stream to said client workstation;
switch encryption mode on the communication link between said server application and said client workstation to said second mode;
remove said encrypt mode command from said data stream to said client workstation; and thereafter
switching encryption mode to a second encryption mode on the communication link between said server application and said client workstation; and thereafter
communicating said new data in said data stream to said client workstation.

9. System for controlling encryption mode during a connection oriented session between a server application and a client workstation, comprising:

a server application;
a display data stream file;
a virtual terminal associated with said client workstation;
an interactive subsystem for generating from said server application and said display data stream file a data stream for putting to said virtual terminal;
a virtual terminal manager for formatting said data stream for communication to said client workstation; and
said virtual terminal manager being responsive to an encrypt command in said data stream to transmit old data in said data stream to said client workstation, to initiate changing of the encryption mode, and thereafter to communicate new data in said data stream to said client workstation.

10. System for switching encryption mode during a connection oriented session between a server application and a client workstation, comprising:

a server application;
a virtual terminal associated with said client workstation;
an interactive subsystem for generating from said server application a data stream for putting to said virtual terminal;
a virtual terminal manager for formatting said data stream for communication to said client workstation; and
said virtual terminal manager being responsive to a user defined mode controlling command in said data stream to transmit old data in said data stream to said client workstation, to initiate switching of the encryption mode, and thereafter to communicate new data in said data stream to said client workstation in the switched encryption mode.

11. Method for controlling encryption mode during a connection oriented session between a server application and a client workstation, comprising the steps of:

establishing said session by connecting said client workstation to said server application with encryption off;
communicating a data stream from said server application to said client workstation, said data stream including an encrypt structured field, said encrypt structured field including an encryption on keyword followed by a password field followed by an encryption off keyword;
upon detecting said encryption on keyword, flushing old data before said keyword in the data stream from said server to said client workstation;
switching encryption mode on the communication link between said server application and said client workstation by renegotiating said connection to have encryption on;
removing said encrypt structured field from said data stream; and thereafter,
communicating new data subsequent to said keyword in said data stream to said client workstation.

* * * * *